May 13, 1958 J. R. FURRER 2,834,303
LIGHTWEIGHT VEHICLE
Filed Nov. 22, 1952 3 Sheets-Sheet 1
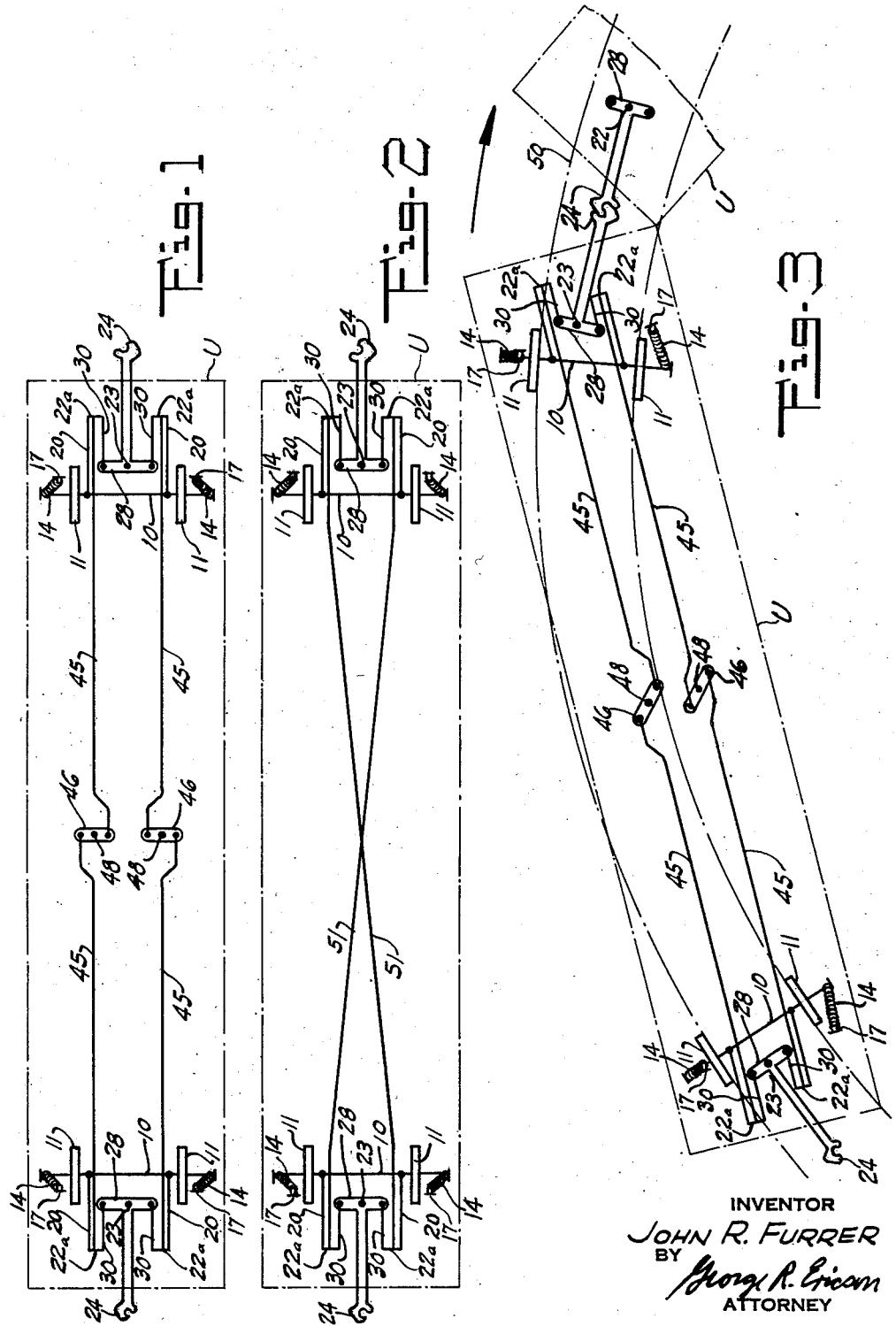
INVENTOR
JOHN R. FURRER
BY
ATTORNEY

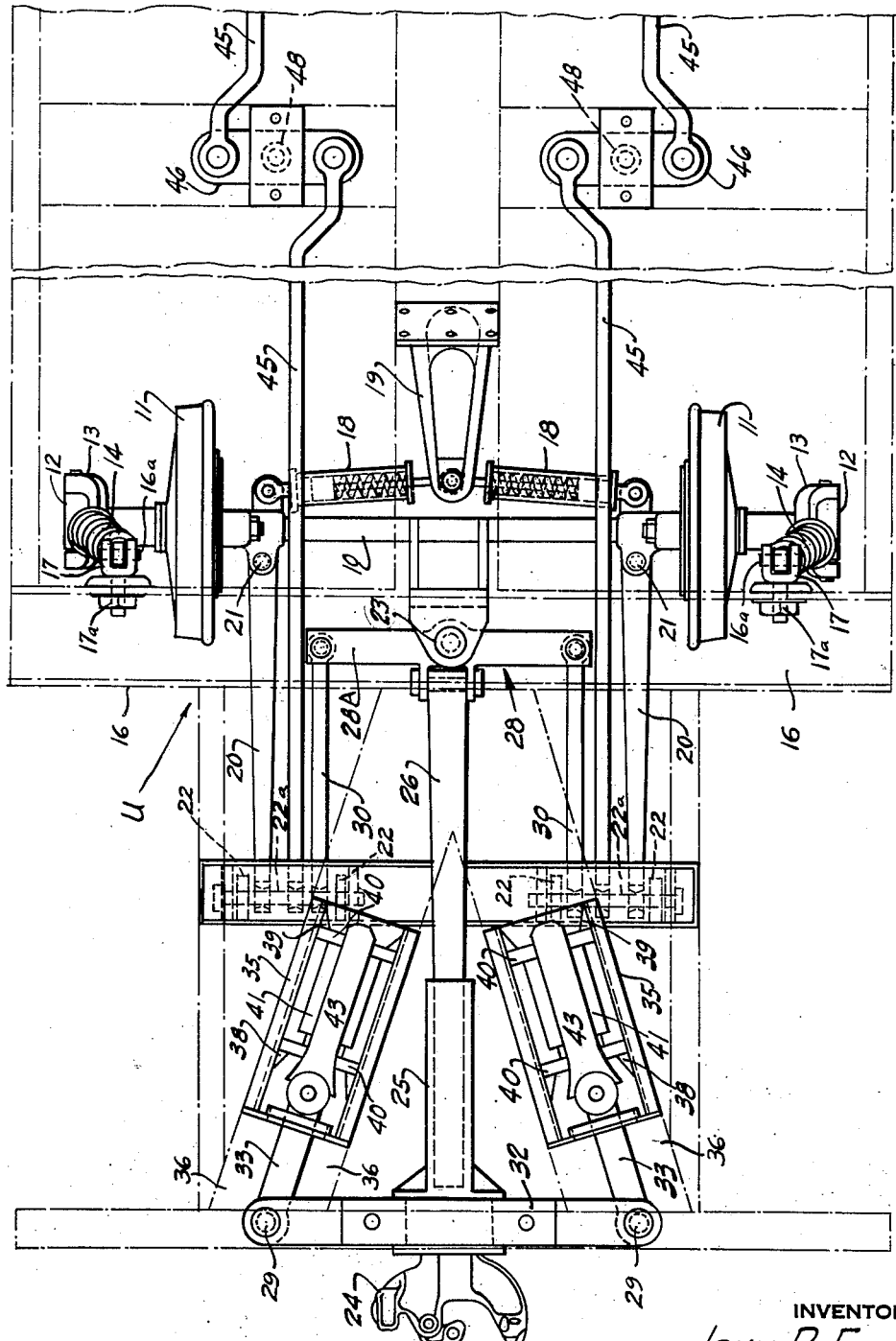

May 13, 1958
J. R. FURRER
2,834,303
LIGHTWEIGHT VEHICLE
Filed Nov. 22, 1952
3 Sheets-Sheet 3
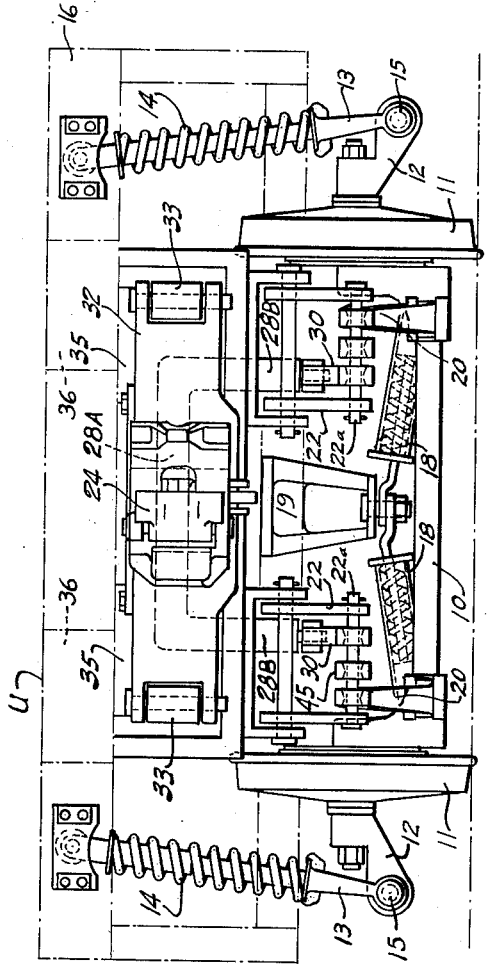
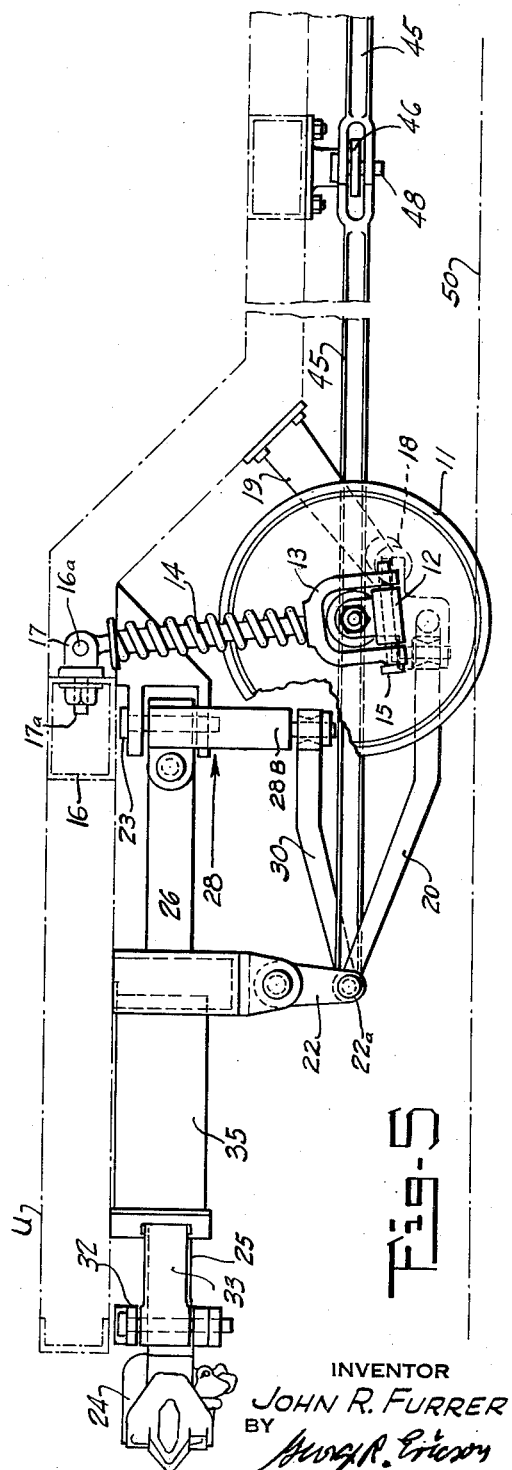
INVENTOR
JOHN R. FURRER
BY
ATTORNEY

United States Patent Office 2,834,303
Patented May 13, 1958

2,834,303

LIGHTWEIGHT VEHICLE

John R. Furrer, Milwaukee, Wis., assignor to ACF Industries, Incorporated, a corporation of New Jersey Application November 22, 1952, Serial No. 322,125

5 Claims. (Cl. 105—176)

This invention relates to railway cars and consists particularly in means for guiding the wheels of long wheel-base, four-wheeled trail cars.

Conventional railway passenger cars range in length up to 85 feet, and, in order to operate on curved track, are pivotally mounted at each end on a four- or six-wheel sprung and equalized truck. Such cars are, to a large extent, independent, self-sufficient units, containing their own power generating, air-conditioning, and sanitary facilities, and relying upon external means only for traction and heating. They are equipped with automatic couplers and other connections which enable them to be easily connected to any other standard railway car. The characteristics enumerated above obviously make possible highly flexible train arrangements, both as to the number of cars in a train and as to the various types of cars composing a train. They also clearly facilitate the addition to or removal of cars from trains. An important disadvantage of such cars is that they cannot be operated safely at extremely high speed on curved trackage, due to the danger of derailment, which makes mandatory substantial speed restrictions on curved trackage. When cars of this type begin to round a curve, the trucks are guided by the engagement of the inner edge of the outer rail and the flanges of the outer wheels, and the outer front wheel flange of each truck digs into and attempts to climb over the rail; that is, it attacks the rail at a positive angle.

Under the Laffite Theory of derailment, the derailing tendency of a vehicle is expressed as a function of the ratio of the radial horizontal thrust of the wheel flange against the rail to the vertical weight applied to the wheel over the rail. The Laffite Theory shows, among other things, that greater safety against derailment can be achieved by arranging the wheels so that they will attack the rail at a zero angle or a negative angle, a negative angle of attack being the angle between the wheel and the rail when the trailing edge of the wheel flange is in contact with the rail.

To provide increased safety against derailment, articulated trains, consisting of a plurality of very short two-wheeled trailers provided with fixed transverse axles, have been built, and, in uni-directional operation, provide the desired negative angle of attack. Because of their short unit length and articulation, two-wheeled units of this type are highly interdependent, with each coach unit depending on an equipment car for special services, lavatories, and entrance doors. A further disadvantage resulting from the shortness of the cars is the fact that all power for air conditioning, lighting, and numerous other uses, must come from the head end, thus increasing the number of connections between the cars and the dependence of the train on a specially equipped locomotive. The articulation of the train, as well as the interdependence of the units, makes it very difficult to add cars to or remove cars from the train. A further serious disadvantage of this type of negative angle, two-wheeled unit, articulated train is the fact that they can be operated in only one direction, operation in the opposite direction resulting in the wheels attacking the outer rails on curves at a positive angle, with consequent decrease in derailment safety.

Accordingly, it is an object of this invention to provide a railway car having the numerous advantages of the conventional double-truck car, listed above, combined with the high degree of anti-derailment safety found in articulated trains of the type mentioned above.

A further object of this invention is to provide a reversible railway car having a derailment safety factor equivalent to that of the negative angle equipment referred to above.

A further object is to provide a draft arrangement which will permit accurate coupler actuation of the wheel guiding arrangement, and will at the same time comply with draft gear requirements of the Association of American Railroads.

An additional object is to provide coupler actuated means for constantly maintaining the wheels of a four-wheel trail car at a zero angle with the rails, regardless of whether the car occupies an intermediate or rearmost position in the train.

Another object is to provide means for automatically banking the car body on curves directly in proportion to the radius of curvature.

Still another object is to provide means for stabilizing the independently guided axles so as to prevent their tendency to hunt under certain conditions.

These and other more detailed objects of the invention will be apparent to those skilled in the art from a study of the following description and accompanying drawings, in which:

Fig. 1 is a schematic plan view of my wheel guiding system and suspension arrangement.

Fig. 2 is a schematic plan view of a modified form of wheel guiding system.

Fig. 3 is a schematic plan view showing the action of the wheel guiding system and suspension arrangement of Fig. 1 on curved trackage.

Fig. 4 is a plan view showing the mechanical details of one of the identical ends of a car underbody incorporating my invention.

Fig. 5 is an elevational view illustrating the structure shown in Fig. 4.

Fig. 6 is an end view of the structure shown in Figs. 4 and 5.

Referring now to the drawings, the letter U indicates a railway car body under frame portion suspended at each end from a rigid axle structure 10, each of which has a flanged wheel 11 rotatably mounted at each end. Brackets 12 are journaled on each end of each of the axle structures. Yokes 13 of spring telescopic strut members 14 are pivotally secured at 15 to brackets 12 to permit limited rotation of the struts in the transverse vertical plane of the car. The car underframe U includes a pair of laterally extending body bolster members 16, one of which is adjacent each end of the car. The upper end of each of the strut members is pivotally secured by pin 16a to a clevis 17, which, in turn, is pivotally secured at 17a to the adjacent body bolster 16, so that each strut can pivot both transversely and longitudinally with respect to the underframe. Simultaneous and opposite longitudinal motion of the two struts of an axle causes the axle to turn in a horizontal plane relative to the car body, thus providing dirigibility of the axle. Strut members 14 are slightly inclined inwardly toward the center of the car and toward the adjacent end of the car in order to achieve a banking effect on curves and to stabilize the axle in a manner to be described later. The underframe shown is of the drop-center type, to accommodate a double-deck passenger car, but it is to be understood that my invention is equally applicable to straight underframes and to all types of car bodies. The invention is in fact not at all limited to car bodies having distinct underframing, being equally suitable for car bodies of unitized construction. The axle is resiliently centered with respect to the car framing by means of a pair of spring cylinders 18, pivotally secured at their outer ends to the axle structure and at their inner ends to bracket 19 fixed to underframe U. Centering devices 18 merely restrict lateral relative motion between the car body and the axle structure and do not interfere with rotation of the axle structure in the transverse plane with respect to the car body.

Guiding of the axle structure is achieved by a system of coupler-actuated linkages. The horizontal position of each axle structure 10 is regulated by a pair of longitudinally extending radius rods 20, each of which is pivotally connected to the axle structure at one end through a resilient connection 21 of the so-called Harris bushing type and at the other end to a pair of swingers 22 which are pivotally suspended from the car underframing adjacent each corner of the car. Each pair of swingers is provided with a transversely extending pin 22a on which are pivotally mounted the ends of radius rods 20, the opening in the radius rods through which the pins pass being provided with rubber bushings to permit limited lateral, as well as vertical, rotation of the radius rods with respect to pins 22a. Radius rods 20 are hung from swingers in order that they may be separately longitudinally displaced in opposite directions thereby to cause rotation of the axle structure 10 in a horizontal plane about its center in accordance with changes in track curvature. Actuation of the radius rods is accomplished through swingers 22, which, in turn, are actuated by movements of the coupler about a pivot pin 23 depending from the car underframe.

The coupler-actuating means shown is part of a draft means comprising a standard AAR type tightlock coupler head 24 formed with a hollow shank 25 for slidable mounting on tongue 26. It is to be understood that any suitable tightlock coupler may be used. Tongue 26 is mounted at its inner end about a transverse horizontal pivot on laterally and downwardly extending yoke-shaped member 28, which in turn is pivoted at the center of its bright portion 28A from the body underframing by means of vertical pivot pin 23, so that the entire assembly pivots freely about pin 23. The ends 28B of yoke 28 are displaced from pivot pin 23 laterally of the car body and are pivotally connected to longitudinally extending links 30 which are connected at their opposite ends to pins 22a of swingers 22, so that as the coupler is deflected from its central position parallel to the longitudinal axis of the car body by means of the coupler on an adjacent car, one of the leading pairs of swingers 22 will be moving forwardly relative to the car body, and the other rearwardly, thereby resulting in a similar movement of the axle structure 10. For example, as the train rounds a left-hand curve, coupler 24 will be directed to the left to an angular extent which is a function of the radius of curvature of the track being traversed, thereby similarly rotating yoke-shaped member 28 and thus moving the right-hand swingers 22 forward and the left-hand swingers 22 rearward, with consequent similar forward and rearward movements of the right- and left-hand ends of the axle structure. The arrangement and proportions of the structure are such that, regardless of the radius of curvature, the axle 10 will always be maintained substantially collinear with the radius of the track curve, and the longitudinal vertical plane of the wheels substantially tangential to the vertical edge of the rails.

Inasmuch as the accurate functioning of the system described above requires that the position of the pivot points 23 be immovable with respect to the car body, it is evident that the mounting of the pivot pins must be rigidly secured to the car underframing, without the interposition of draft gear therebetween as is customary with conventional standard radial couplers. Further, it is evident that incorporating the draft gear in a pivoted draw bar, as is conventionally done in radial coupler applications on equipment designed for extremely short radius track curves would not meet the minimum requirements that the draft gear act as a device for spreading the coupler shocks over a relatively broad area of heavy structural body members. To effect substantial compliance with the above indicated requirements, and at the same time to permit substantial rotation of the coupler, I provide a novel draft gear arrangement constituting the remainder of the draft means, of which the portion constituting the axle guiding means has already been described. It consists of a transversely extending coupler carrier 32 firmly mounted on the hollow shank 25 and having a central opening to permit relative vertical movements, only, of the coupler therein, and is provided at each end with pivots 29 to receive the outer end of draft links 33. Radially directed draft gear housings 35 are rigidly secured to similarly directed underframe members 36. Draft gear housings 35 include forward and rear draft lugs 38 and 39 respectively, and provide a mounting for followers 40, conventional draft gear 41, and swivel type yoke 43. Draft links 33 are pivotally secured to the end of yokes 43, so that all draft and buff shocks will be transmitted from the coupler through carrier 32 and links 33 into the draft gear where they will be absorbed while the shank 25 and tongue 26 jointly constitute a telescopic, longitudinally extending portion of the coupler which yields freely to draft and buff forces and transmits to yoke 28 only the direction and extent of the angular deviation of the coupler from the longitudinal axis of the car. Rotation of the coupler about pivot 23 will be permitted by the pivotal arrangement of the carrier, links 33, and the draft yoke, and by the compressibility of the draft gear itself. My draft arrangement serves the further purpose of providing an automatic means for centering the coupler at all times.

The device, to the extent described above, provides means for guiding the axle adjacent the coupled end of a car. However, in order that cars of this type be usable in any position in the train, including the rear end, it is essential that means be provided for guiding the uncoupled end of a car of this type. The preferred means to this end is best illustrated in Figs. 1, 3 and 4. It consists of a pair of reversing linkages connecting the swinger pins 22a at one end of the car with the swinger pins on the same side at the other end, so that when the swingers and adjacent axle end are moved outwardly at one end of the car, the corresponding swingers and axle end at the other end of the car will be moved outwardly a similar distance and likewise the swingers and axle ends adjacent the inside of the track curve will be moved inwardly toward the center of the car equal distances, as best shown in Fig. 3. Each of the reversing linkages, referred to above, consists of a pair of longitudinally extending links 45, each connected at one end to swinger pin 22a and at their other end to respectively opposite ends of small class 1 levers 46 fulcrumed from the car underframing at 48.

Operation of the axle guiding arrangement is best shown in Fig. 3, in which the numeral 50 indicates a portion of curved trackage, the radius of curvature being substantially less than in actual steam railroad practice, in order to more clearly demonstrate operation of the axle guiding system. It will be noted that the draw bars of the connected cars, being equipped with tightlock couplers, form a rigid link between the pivot points 23 of the adjacent cars, so that at all times the movement of the coupler from its dead center position is a function of the radius of curvature. In Fig. 3, assuming the train to be moving from left to right, in the direction of the arrow, it will be noted that coupler actuated member 28 on the front of the car directs the outside end of front axle 10 toward the front of the car and the inside end of axle 10 away from the front end of the car. As will be noted the reversing linkages 45—48 cause the outside end of the rear axle to be moved rearwardly and the inside end of the rear axle to be moved forwardly, so that all four wheels remain at all times tangent to the track rails.

As has been indicated above, the transverse inclination of the strut members 14 from the lower pivot is toward the center of the car, and the longitudinal inclination is toward the adjacent end of the car; that is, toward the end of the radius rods pivotally secured to the swinger. The longitudinal inclination serves to stabilize the axle by maintaining the radius rods in tension, and to achieve automatic banking on curves.

It has been found that when radius rods are used to connect axles to vehicle bodies, the axles are stable when the radius rods are in tension, and unstable—that is, they tend to hunt—when the radius rods are in compression. The degree of inclination of the struts is such that the horizontal component of the force being applied through them is sufficient to keep the radius rods in tension under all normal operating conditions.

The desired banking effect is achieved as follows: When the car rounds a curve, as shown in Fig. 3, the distance between outside wheels is lengthened, while the distance between the inside wheels is shortened, so that the outside struts straighten up, thereby raising the outside of the car, while the inside struts become more inclined, thereby lowering the inside of the car. Since the inclination of the struts is directly proportional to the guided positions of the axle, the banking effect is a function of the radius of track curvature. The banking effect achieved by the longitudinal inclination of the struts is augmented by transversely inclining the struts toward the center of the car, as shown. However, unless it is desired that the banking effect be thus augmented, the struts may be placed vertically, or inclined outwardly.

Another slightly different modification of the axle guiding arrangement is shown in Fig. 2, in which a pair of crossed links 51 are substituted for the reversing linkages 45—48. Operation of the device shown in Fig. 2 is substantially the same as that of the device of Figs. 1 and 3–6.

Although the arrangement illustrated and described shows a standard coupler mounted at standard coupler height, with consequent elevation of the end portion of the car underframe, it is to be understood that the invention is equally applicable to cars having a low floor throughout with a proportionately low coupler height.

The invention may be modified as will occur to those skilled in the art, and the exclusive use of all modifications as come within the scope of the appended claims is contemplated.

I claim:

1. A railway car comprising the combination with a car body portion and a pair of axles, each axle having a wheel at each end thereof and being dirigibly mounted adjacent an end of said car, of a swinger mounted for longitudinal swinging motion on said car body adjacent each corner thereof, a radius rod extending substantially longitudinally of said car body and connecting each axle end to the adjacent swinger, a draft means including a coupler pivotally connected to said car body portion for swinging in a horizontal plane, said coupler having a longitudinally extending portion extending beyond the adjacent end of said car body for coupling said car to an adjacent car, said coupler further comprising a yoke portion at its pivoted end and extending laterally on each side thereof, a link extending substantially longitudinally of said car and connecting each end of said yoke portion to the adjacent swinger, and linkage means connecting together the swingers at opposite ends of said car for moving the swingers on the same side of the car either toward or away from each other upon the actuation of the swingers at either end of the car, whereby swinging of a coupled coupler actuates the axle at the coupled end of said car through said yoke, said links, said swingers and said radius rods to a position collinear with the radius of a curve of trackage being traversed, and the axle at the opposite end of the car is actuated through said yoke, said links and said swingers at the coupled end of the car, and further through said linkage means connecting together the swingers at opposite ends of the car, and further through said swingers and radius rods at the opposite end of the car, to a corresponding collinear position.

2. A railway car comprising the combination with an underframe and an axle located adjacent each end thereof, said axle further having a wheel at each end thereof, of a resilient strut pivotally mounted on said underframe adjacent each corner thereof for longitudinal swinging relative thereto, said strut further being pivotally connected to the adjacent axle end and said axle thereby being dirigible, resilient means for laterally centering said underframe with respect to said axles, a longitudinally swingable element suspended from said underframe adjacent each corner thereof, a substantially longitudinally extending radius rod connecting each axle end to the adjacent swingable element, draft means including a coupler pivotally mounted on said underframe adjacent each end thereof for horizontal swinging movement and having a longitudinally extending portion extending beyond the adjacent end of said underframe for coupling the car to an adjacent car, said coupler further comprising a yoke portion at its pivoted end and extending laterally on each side thereof, a link extending from each end of said yoke portion to the adjacent swingable element and actuating one such element forwardly of said car and the other such element rearwardly of said car in response to angular motion of said coupler connected to an adjacent car when the two cars are on a curved track, whereby swinging of a coupled coupler actuates the axle at the coupled end of said car through said yoke, said links, said swingers and said radius rods to a position collinear with the radius of a curve of trackage being traversed, and the axle at the opposite end of the car is actuated through said yoke, said links, and said swingers at the coupled end of the car, and further through said linkage means connecting together the swingers at opposite ends of the car, and further through said swingers and radius rods at the opposite end of the car, to a corresponding collinear position.

3. A railway car having, in combination, an underframe, a substantially vertical pivot pin mounted on said underframe adjacent each end thereof, draft means including a coupler mounted on each pivot pin for swinging motion in a horizontal plane, said coupler comprising a yoke portion at its pivoted end extending in both lateral directions from said pivot pin, said coupler further comprising a portion extending from said pivot pin longitudinally beyond the adjacent end of said underframe for coupling said car to an adjacent car, a pair of swingers on each side of said underframe between the adjacent end thereof and said pivot pin, said swingers comprising upper and lower horizontal pivot pins extending substantially laterally of said car, a link extending substantially longitudinally of said car and connecting each side of said yoke to said lower pivot pin of said pair of swingers on the respective side of said car, a car axle adjacent each end of said car, a wheel on each end of said axle, a resilient strut on each side of said car at each end thereof, each said strut being pivotally connected to said underframe for longitudinal swinging movement relative thereto, each strut further being connected to an end of an axle, a radius rod extending from said lower pivot pin of each pair of swingers to the adjacent axle adjacent an end thereof, and a linkage connecting said lower pivot pins of said swingers at one end of said car to those at the other end, whereby swinging of a coupled coupler actuates the axle at the coupled end of said car through said yoke, said links, said swingers and said radius rods to a position collinear with the radius of a curve of trackage being traversed, and the axle at the opposite end of the car is actuated through said yoke, said links, and said swingers at the coupled end of the car, and further through said linkage means connecting together the swingers at opposite ends of the car, and further through said swingers and radius rods at the opposite end of the car, to a corresponding collinear position.

4. In a railroad car according to claim 1, said draft means further comprising resilient draft gear pivotally connected to said coupler intermediate the outer end of said coupler and said yoke, said draft gear further being connected to said underframe, said longitudinally extending portion of said coupler further being telescopic, said draft gear intercepting all draft and buff forces acting on said coupler and said telescopic portion yielding freely to said draft and buff forces and transmitting to said yoke only the direction and extent of an angular deviation of said coupler from the longitudinal axis of said car.

5. A structure according to claim 1, said draft means further including a carrier connected to said coupler adjacent the outer end of said longitudinally extending portion and extending laterally on both sides from said last mentioned portion, said draft means further comprising a draft link pivotally connected to said carrier in spaced relation to said longitudinally extending portion on each side of the latter, a housing firmly connected to said car body portion on each side of said longitudinally extending portion of said coupler, a draft gear in each housing, each of said draft links being connected to one of said draft gears, and said longitudinally extending portion further being telescopic and transmitting to said yoke portion only rotational movement about the pivot of the latter, draft and buff shocks being transmitted by said coupler carrier, draft links and draft gear to said car body.

References Cited in the file of this patent

UNITED STATES PATENTS

| | | |
|---|---|---|
| 32,423 | Howard | May 28, 1861 |
| 207,453 | Souther | Aug. 27, 1878 |
| 289,421 | Krajewski | Dec. 4, 1883 |
| 292,166 | Hoit | Jan. 22, 1884 |
| 320,011 | Souther | June 16, 1885 |
| 449,388 | Schroyer et al. | Mar. 31, 1891 |
| 524,072 | Richards | Aug. 7, 1894 |
| 976,845 | Blake | Nov. 29, 1910 |
| 1,003,277 | Lincoln | Sept. 12, 1911 |
| 1,450,041 | Kitchen | Mar. 27, 1923 |
| 2,098,949 | Geissen | Nov. 16, 1937 |
| 2,167,034 | Strauss | July 25, 1939 |
| 2,225,418 | Larsson | Dec. 17, 1940 |
| 2,404,091 | Porteus | July 16, 1946 |
| 2,440,746 | Hereford | May 4, 1948 |
| 2,464,760 | Dean | Mar. 15, 1949 |
| 2,523,113 | Hanna et al. | Sept. 19, 1950 |

FOREIGN PATENTS

| | | |
|---|---|---|
| 14,023 | Great Britain | 1912 |